US008433691B2

(12) United States Patent
Noehring et al.

(10) Patent No.: US 8,433,691 B2
(45) Date of Patent: *Apr. 30, 2013

(54) APPARATUS AND METHOD FOR RESOLVING SECURITY ASSOCIATION DATABASE UPDATE COHERENCY IN HIGH-SPEED SYSTEMS HAVING MULTIPLE SECURITY CHANNELS

(75) Inventors: Lee P. Noehring, Peoria, AZ (US); Chad W. Mercer, Chandler, AZ (US); Steve J. Brown, Phoenix, AZ (US)

(73) Assignee: Exelis, Inc., McLean, VA (US)

( * ) Notice: Subject to any disclaimer, the term of this patent is extended or adjusted under 35 U.S.C. 154(b) by 11 days.

This patent is subject to a terminal disclaimer.

(21) Appl. No.: 13/004,778

(22) Filed: Jan. 11, 2011

(65) Prior Publication Data
US 2011/0119305 A1    May 19, 2011

Related U.S. Application Data

(60) Continuation of application No. 12/558,188, filed on Sep. 11, 2009, now Pat. No. 7,958,098, which is a division of application No. 09/921,677, filed on Aug. 3, 2001, now Pat. No. 7,613,699.

(51) Int. Cl.
*G06F 17/30* (2006.01)

(52) U.S. Cl.
USPC .......... 707/694; 707/779; 707/783; 709/228; 709/229; 713/201

(58) Field of Classification Search .................. 707/694, 707/779, 781–786; 709/228–229; 713/201; 370/230, 338; 711/145, 151, 158
See application file for complete search history.

(56) References Cited

U.S. PATENT DOCUMENTS

| 5,948,080 | A  | * | 9/1999 | Baker ............................ 710/37 |
| 6,715,046 | B1 | * | 3/2004 | Shoham et al. ............... 711/158 |
| 2002/0002618 | A1 | * | 1/2002 | Vange ........................... 709/228 |
| 2003/0126233 | A1 | * | 7/2003 | Bryers et al. .................. 709/219 |

* cited by examiner

*Primary Examiner* — Hanh Thai
(74) *Attorney, Agent, or Firm* — Davidson Berquist Jackson & Gowdey, LLP

(57) ABSTRACT

An apparatus and method for updating security association database entries in a system having multiple security channels by selectively granting access to the entries by a plurality of the multiple security channels that may need to update the same entry using a first-come, first-served scheme. The apparatus includes a controller circuit that functions to carry out the method which, for each of the multiple security channels, includes determining whether another of the security channels has a higher priority to access a particular security association database entry. If no other channel has a higher priority, then the channel requesting access to the entry retrieves it from its address location, modifies it, and writes the modified entry back to its address location. The controller prevents other channels from simultaneously, or substantially simultaneously, retrieving and modifying the same entry.

19 Claims, 8 Drawing Sheets

APPARATUS AND METHOD FOR RESOLVING SECURITY ASSOCIATION DATABASE UPDATE COHERENCY IN HIGH-SPEED SYSTEMS HAVING MULTIPLE SECURITY CHANNELS

RELATED APPLICATIONS

This application is a Continuation of and claims benefit to U.S. patent application Ser. No. 12/558,188, filed Sep. 11, 2009 now U.S. Pat. No. 7,958,098, which is a Divisional of U.S. patent application Ser. No. 09/921,677, filed Aug. 3, 2001 now U.S. Pat. No. 7,613,699, both of which are incorporated by reference herein.

BACKGROUND OF THE INVENTION

1. Field of the Invention

The present invention relates to an apparatus and method for resolving database update coherency issues in multi-channel systems and, more particularly, to an apparatus and method for resolving security association database update coherency issues in high-speed systems having multiple security channels.

2. Description of Related Art

Data that is transferred over an interconnected computer network, such as the Internet, is susceptible to various forms of attack. These attacks may result in such things as loss of privacy, loss of data integrity, identity theft, denial of service, or any combination of these attacks. The ever-expanding popularity of the Internet for secure communications, e-commerce, and various other transactions, has led to the need to ensure communications over non-secure interconnected computer networks like the Internet are secure from such attacks.

In order to address the above-mentioned concerns, the so-called "Internet Engineering Task Force" (IETF) developed a framework of open standards for ensuring the confidentiality, integrity, and authenticity of private communications over the Internet. This standards framework is known in the art as the Internet Security Protocol, or "IPSec." IPSec provides security services at the IP layer of a system, and allows a system to select required security protocols, determine the algorithm(s) used to secure data, and implement any cryptographic keys required to provide the security services. Because these security services are implemented within the IP layer, the IPSec services may be used by any higher layer protocol, such as TCP (Transmission Control Protocol), UDP (User Datagram Protocol), ICMP (Internet Control Message Protocol), BGP (Border Gateway Protocol), or various other protocols known in the art. IPSec can be used to establish one or more secure communication channels between host computers, between security gateways, such as a router or firewall, or between hosts and security gateways.

As is known, IP data traverses an interconnected computer network as discrete data packets, colloquially referred to as IP datagrams. IPSec provides a new set of IPSec headers that are added to IP datagrams. The new IPSec headers, among other things, provide information regarding the security protocols that are used to secure the IP datagram payload as it traverses an interconnected computer network. These security protocols are known as the Authentication Header (AH) and Encapsulating Security Payload (ESP). The AH security protocol provides connectionless integrity, data origin authentication, and an optional anti-replay service, and is represented using protocol number 51. The ESP security protocol provides confidentiality, integrity, data origin authentication, and anti-replay services, and is represented using protocol number 50. The AH and ESP protocols can be used independently or in combination with each other to provide a desired set of security services.

Fundamental to the use and understanding of IPSec is the Security Association (SA). In general, an SA is a relationship between two or more devices that describe how the devices will use IPSec's security services to securely communicate with each other. An SA is unidirectional. Hence, to secure bi-directional communication channels between two nodes in an interconnected computer network, two SAs are required, one for each direction. These individual secure communication channels are referred to as an "inbound tunnel" and an "outbound tunnel," where one device's inbound tunnel is the other device's outbound tunnel, and vice-versa.

All active SAs of a device are stored as SA data structures within a centralized database, known as a Security Association Database (SAD). Thus, each active SA, both inbound and outbound, has an entry in the SAD. When one device sends an IP packet that requires IPSec protection, the device transmitting the protected IP datagram will locate an appropriate SA entry in the SAD, update the SAD entry, and process, e.g., encrypt and/or authenticate, the packet in accordance with the SA located in the SAD entry. The encrypted packet is then transmitted to the non-secure network, via, for example, a network processor. Likewise, when a device receives a protected IP datagram, the receiving device locates an appropriate SA entry in the SAD, processes the packet in accordance with the SA located in the SAD entry, and updates the SAD entry.

Secure data transmission and processing is targeting higher and higher speeds. Thus, devices are being implemented that consist of multiple processing channels, each of which can process multiple packets. Potentially, individual channels in these multi-channel systems may need to access the same SAD entry simultaneously. As just noted, SAD entry update is part of the IPSec processing that takes place during both inbound and outbound processing of IPSec datagrams. Hence, if two or more channels access the same SAD entry simultaneously, these same channels may attempt to update the same SAD entry simultaneously, or substantially simultaneously. If this occurs some of the SAD entry updates will be lost, which could result in a security breach. Although complex algorithms and devices are known in the art for resolving such coherency issues, these known methods and devices are complex, and adversely affect system performance.

Hence, there is a need in the art for an apparatus and method that addresses the above-noted deficiencies. Namely, an apparatus and method that resolves SAD entry update coherency issues without relying on complex algorithms or devices. There is additionally a need for an apparatus and method that resolves SAD entry update coherency issues without introducing significant delay to IPSec traffic.

SUMMARY OF THE INVENTION

The present invention provides an apparatus and method for updating IPSec SAD entries in a system having multiple security channels by selectively granting access to SAD entries by a plurality of the multiple security channels that may need to update the same SAD entry using a first-come, first-serve scheme.

In one aspect of the present invention, in a system having multiple security channels, a method associated with each channel for modifying an entry in a security association database includes determining whether another of the multiple security channels has a higher priority to access a security association database structure located at a predetermined address location in the security association database. When no other security channel has a higher priority to do so, the security association data structure is retrieved from the predetermined address location. The retrieved security association data structure is modified, and written to the predetermined address location in the security association database.

In another aspect of the present invention, in a system having multiple security channels, a controller for managing access to an entry in a security association database includes a register circuit and an arbiter circuit. The register circuit includes a plurality of first registers each individually communicating with one of the multiple security channels and each is operable to receive a request, from its associated security channel, to retrieve a security association data structure located at a predetermined address in the security association database. The arbiter circuit communicates with each of the register circuits and is operable (i) to prioritize, from highest to lowest priority, the retrieval requests received by each of the first registers and (ii) to grant the retrieval request to the security channel having the highest priority.

In yet another aspect of the present invention, in a system having multiple security channels, a controller for managing access to an entry in a security association database includes a weight control logic circuit, a grant tree logic circuit, and a grant logic circuit. The weight control logic circuit is operable to assign a weight value to retrieval requests received by the controller from the multiple security channels. The grant tree logic circuit is coupled to the weight control logic circuit and is operable to (i) determine which of the retrieval requests has a highest weight value and (ii) generate a grant signal for the retrieval request with the highest weight value. The grant logic circuit is coupled to receive the grant signal from the grant tree logic circuit and, in response thereto, grant the retrieval request to the security channel having the highest weight value.

DETAILED DESCRIPTION OF VARIOUS EMBODIMENTS

Figure 1:
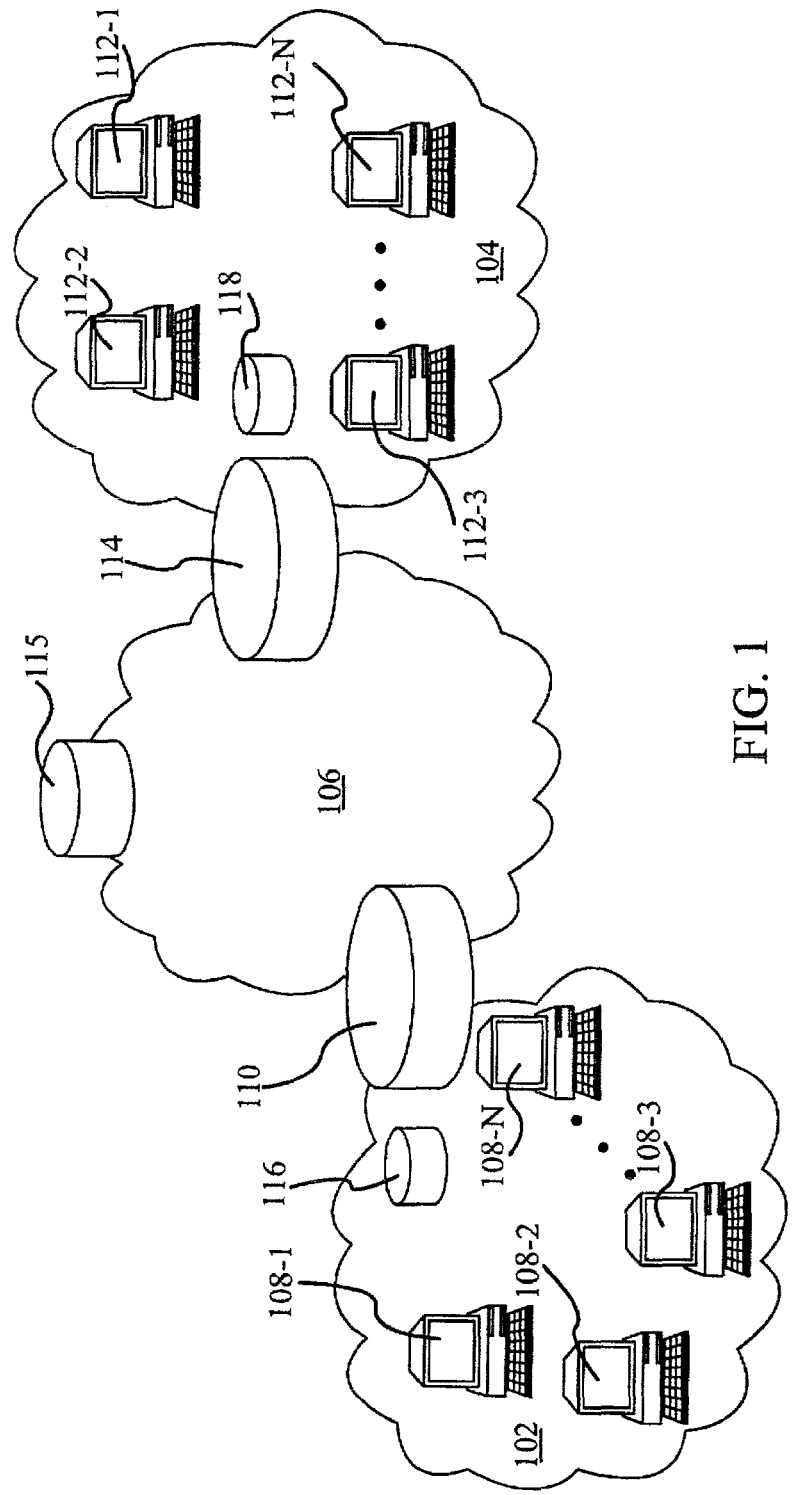
FIG. 1 is a functional block diagram depicting various computers communicating over an interconnected computer network.

A functional block diagram depicting various computer devices communicating over an interconnected computer network is depicted in FIG. 1. The system 100 depicts a first local network 102 coupled to a second local network 104 via an external non-secure computer network 106, such as the Internet. The first local network 102 includes a plurality of first individual computer workstations 108-1, 108-2, 108-3, . . . 108-N coupled to a first gateway computer 110, and the second local network 104 includes a plurality of second individual computer workstations 112-1, 112-2, 112-3, . . . 112-N coupled to a second gateway computer 114. It will be appreciated that the system 100 depicted in FIG. 1 is only exemplary of one embodiment, and that other embodiments are encompassed by the present invention. For example, the system may include individual computer workstations coupled directly to the Internet 106, or to the Internet 106 via a service provider.

Figure 2:
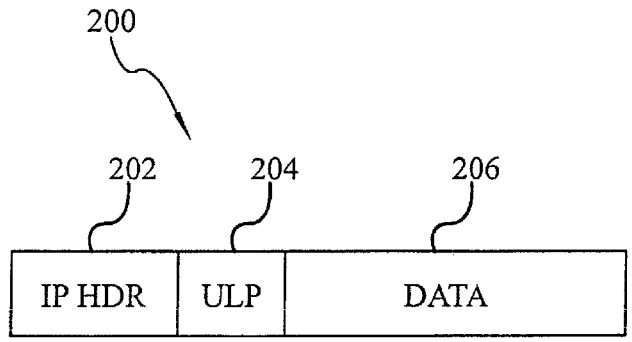
FIG. 2 depicts the general structure of an IP datagram.
Figure 3:
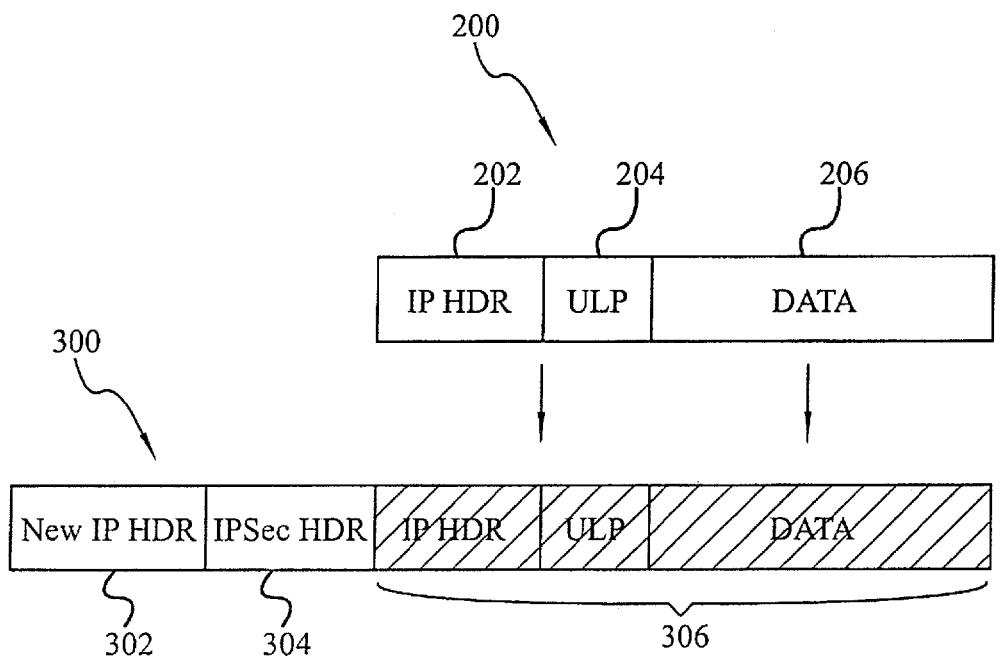
FIG. 3 depicts the general structure of an IPSec datagram for tunnel mode operation.
Figure 4:
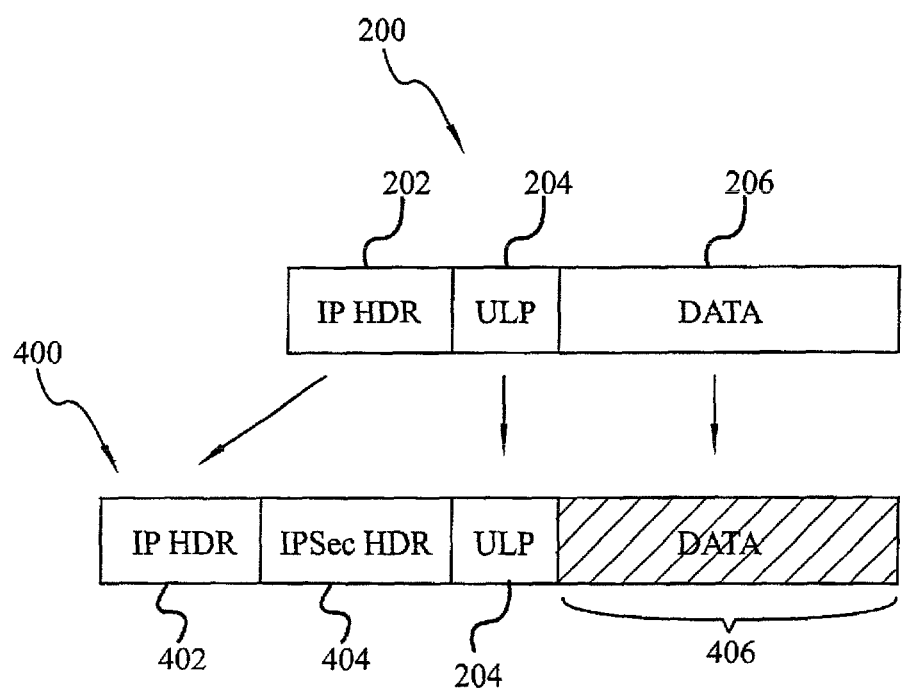
FIG. 4 depicts the general structure of an IPSec datagram for transport mode operation.

As was noted above, data traverses the Internet 106 as IP datagrams. An IP datagram 200, as depicted in FIG. 2, typically includes an IP header portion 202, an upper layer protocol (ULP) header 204, and a data payload 206. Examples of an outbound IPSec datagram, i.e., an IP datagram subject to IPSec processing and for transmission to an intended destination, are depicted in FIGS. 3 and 4 for tunnel mode and transport mode, respectively. As depicted therein, an IPSec datagram 300, 400 includes an IP header portion 302, 402, an IPSec header portion 304, 404, and an encrypted and/or authenticated payload portion 306, 406. The IP header portion 302, 402 may be either a new IP header portion 302, if operating in IPSec tunnel mode (FIG. 3), or the original IP header 402 of the unencrypted IP datagram 200, if operating in transport mode (FIG. 4). The encrypted and/or authenticated payload portion 306, 406 (represented by the diagonal lines) includes encrypted and/or authenticated forms of the data payload portion 206 from the unencrypted IP datagram 200. And, if operating in tunnel mode, the encrypted and/or authenticated payload portion 306 will also include an encrypted form of the original IP header portion 202 and upper layer protocol portion 204. Alternatively, in the transport mode, the original upper layer protocol portion 204 is included in its original form. The tunnel and transport operational modes are known in the art, and are explained in detail in RFC 2401, "System Architecture for the Internet Protocol," the entirety of which is hereby incorporated by reference.

Figure 5:
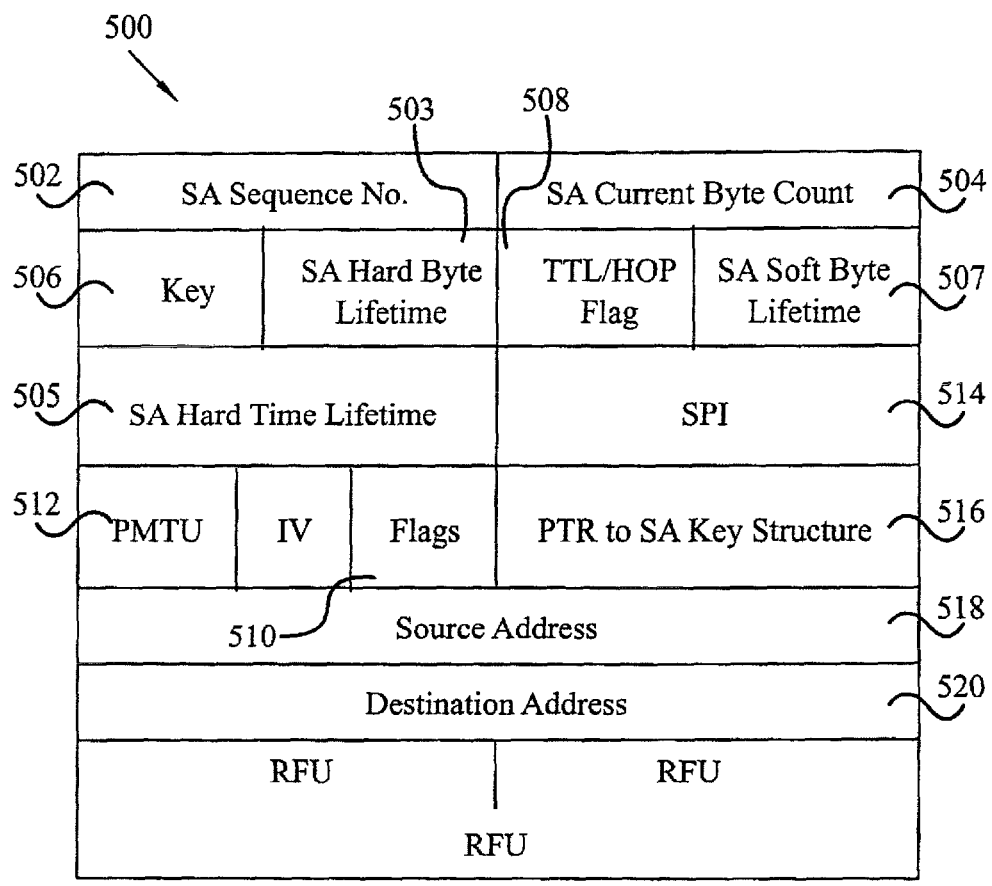
FIG. 5 depicts an example of an outbound security association data structure that is stored as an entry in a security association database.
Figure 6:
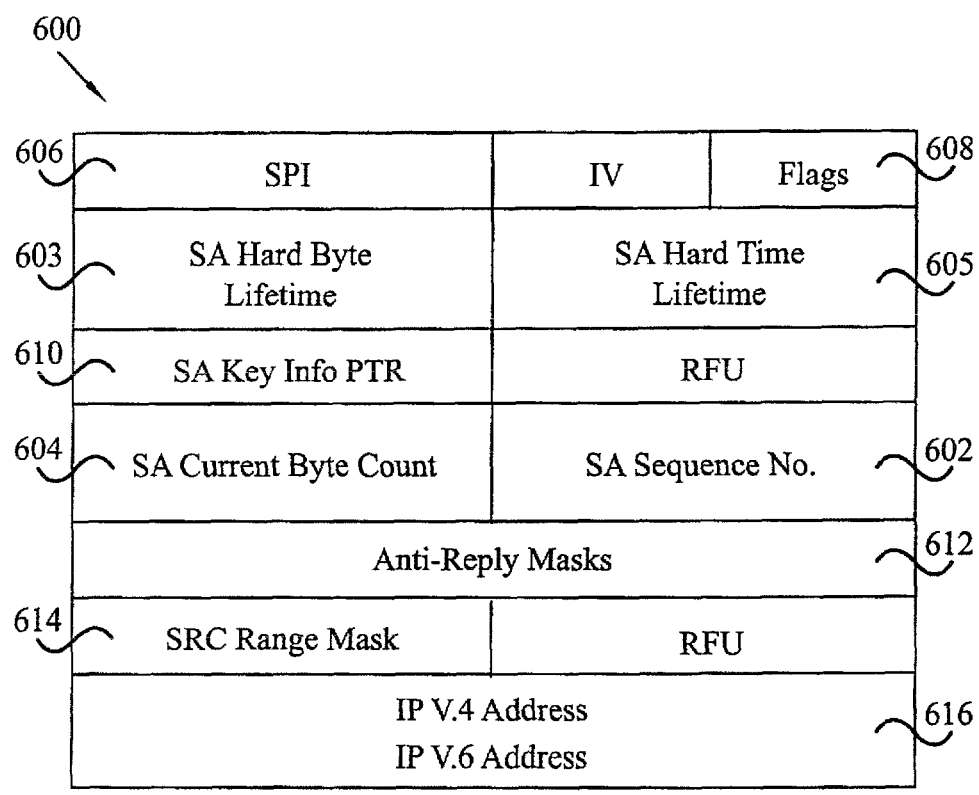
FIG. 6 depicts an example of an inbound security association data structure that is stored as an entry in a security association database.

It was additionally noted above that all active inbound and outbound SAs of a device are stored as SA data structures within a Security Association Database (SAD). Examples of outbound and inbound SA data structures that are stored as entries in an SAD 116, 118 are depicted in FIGS. 5 and 6, respectively. It is to be appreciated that, although the data structures depict specific locations for specific elements within each data structure, these arrangements of specific elements are only exemplary of preferred embodiments. Indeed, each of the specific elements could be stored in locations other than those depicted and described.

In any case, referring first to FIG. 5, in a preferred embodiment an outbound SA data structure 500 includes an SA SEQUENCE NUMBER field 502, an SA HARD BYTE LIFETIME field 503, an SA CURRENT BYTE COUNT field 504, an SA HARD TIME LIFETIME field 505, and an SA SOFT BYTE LIFETIME field 507. The purpose of the SA SEQUENCE NUMBER field 502 is to provide anti-replay detection. The SA HARD BYTE LIFETIME field 503 defines the absolute maximum number of bytes that a specific SA can process. Once this maximum number is exceeded, the SA is no longer available for use and the security keys are marked expired. The SA HARD TIME LIFETIME field 505 defines the absolute maximum number of seconds that a specific SA can be available. Once this time is exceeded, the SA is no longer available for use and the security keys are marked expired. The SA SOFT BYTE LIFETIME field 507 defines a threshold number of bytes that a specific SA can process before renegotiation. Once this number is exceeded, the SA requires renegotiation and IKE is notified. The SA can continue to be used until renegotiation is complete, or until the HARD BYTE LIFETIME value is exceeded which ever occurs first. The SA CURRENT BYTE COUNT field 504 contains the current bytes processed by a specific SA, and is compared against the values in the HARD and SOFT BYTE LIFETIME fields 505, 507. As will be discussed further below, at least these five fields of the outbound SA data structure 500 are modified as part of the processing routine for outbound data packets.

The outbound SA data structure 500 further includes an 8-bit KEY field 506, a TTL/HOP flag field 508, a FLAG field 510, a PMTU (packet maximum transmission unit) field 512, an SPI (security policy index) field 514, a POINTER field 516, a TUNNEL SOURCE ADDRESS field 518, and a TUNNEL DESTINATION ADDRESS field 520. The KEY field 508 is used to verify that the particular SAD entry specified by the network processor is a valid SAD entry. The TTL/HOP flag 508 determines whether the TTL/HOP field from the SAD entry or from the inner header of the packet being processed is copied. The FLAG field 510 includes flags used to control various outbound packet processes. Details associated with each of these flags is not necessary to an understanding of the present invention and will, therefore, not be discussed in detail. The PMTU field 512 indicates the maximum packet length, including both the inner and outer headers, established for the outbound security tunnel. The SPI field 514 includes an SPI value that was agreed upon when the outbound SA was established. As is known in the art, the SPI value is transmitted with each IPSec datagram and is used, along with other data values, by the node receiving the IPSec packet to locate the agreed-upon SA in the SAD. The POINTER field 516 stores a pointer that is used to locate the appropriate SA key structure for outbound packet processing. The TUNNEL SOURCE ADDRESS field 518 and the TUNNEL DESTINATION ADDRESS field 520 specify, as each connotes, the source and destination addresses of the intercommunicating computers between which the particular SA has been established. Finally, it is noted that the particular outbound data structure depicted in FIG. 5 includes one or more fields 522 that are reserved for future use (RFU).

Turning now to FIG. 6, in a preferred embodiment an inbound data structure 600 includes, similar to the outbound SA data structure 500, an SA SEQUENCE NUMBER field 602, an SA HARD BYTE LIFETIME FIELD 603, and SA CURRENT BYTE COUNT field 604, and an SA HARD TIME LIFETIME FIELD 605. These fields serve the same purpose in the inbound data structure 600 as in the outbound data structure and, as with the outbound SA data structure 500, are modified as part of the inbound data packet processing routine.

The inbound SA data structure 600 further includes an SPI field 606, a FLAG field 608, an SA KEY INFORMATION POINTER field 610, an ANTI-REPLAY MASK field 612, and an IP VERSION ADDRESS field 614. The SPI field 606, similar to the outbound SA data structure 500, includes the SPI value that was agreed upon when the inbound SA was established for the security tunnel. Also similar to the outbound SA data structure 500, the FLAG field 608 includes flags used to control various inbound packet processes. The SA KEY INFORMATION POINTER field 610 includes a pointer value associated with the security key being used. The ANTI-REPLAY MASK field 612 includes various anti-replay masks that can be used when the anti-replay service is enabled. And finally, the IP VERSION ADDRESS field 603 includes various data depending upon whether IP version 4.0 or IP version 6.0 is being utilized. This information is not needed to understand the present invention and will not be further discussed.

As a precursor to a more detailed discussion of the present invention, a general discussion of secure communications between two computers using IPSec will first be provided. In this regard, and with reference once again to FIG. 1, when the operator of one of the first individual computer workstations, for example 108-1, wants to communicate with the operator of one of the second individual computer workstations, for example 112-1, the operator of the first individual computer workstation 108-1 sends data toward the operator of the second individual computer workstation 112-1. As was just discussed above, the data is sent in the form of IPSec datagrams. The first gateway computer 110 receives the first datagram from the computer workstation and determines whether an IPSec SA exists with the second gateway computer 114. If not, then the first gateway computer 110 requests an IPSec SA from the second gateway computer 114, preferably via so-called Internet Key Exchange (IKE) software. The IKE software preferably resides in a software stack within each of the first 110 and second 114 gateway computers. The IKE software used may be any one of various conventional IKE software packages known in the art. Examples include, but are not limited to, IKE software licensed from Lucent™ or SafeNet™.

If the first 110 and second 114 gateway computers already share an IKE SA, then the IPSec SA can be created fairly quickly. If not, then an IKE SA must first be established before an IPSec SA can be established. To establish an IKE SA, the first 110 and second 114 gateway computers exchange digital certificates that have been digitally signed by a trusted third party certificate authority 115. Thereafter, when the IKE session becomes active, the first 110 and second 114 gateway computers can establish the IPSec SA.

In order to establish the IPSec SA, the first 110 and second 114 gateway computers must agree upon an encryption algorithm, an authentication algorithm, an SPI value, and a shared session key. When this is done, the IPSec SA has been established, and the first 110 and second 114 gateway computers store the SA in an entry in their respective Security Association Databases (SADs) 116, 118. As will be described in more detail below, the SADs 116, 118 reside in a memory storage device, which may be incorporated into the gateway computers 110, 114 or, as depicted in FIG. 1, be physically separate therefrom.

Once the SA has been established, when an IPSec hardware component (not illustrated in FIG. 1) in the first gateway computer 110 receives an IP datagram 200 for IPSec processing from the first individual computer 108-1, the IPSec hardware component looks up a security policy in a non-illustrated security policy database (SPD). The IPSec hardware component then selects one of the plurality of independent channels to process the datagram. Preferably, a least busy channel is selected. Then, based on information from the SPD look up, an outbound SA data structure 500 is retrieved into a buffer, such as a DMA, from an appropriate entry in the SAD 116. Thereafter, the outbound SA data structure 500 is updated and written back to the same SAD entry. Specifically, as was noted above, the security association sequence number 502 and the security association byte count 504 are each incremented as part of the SAD update. As will be discussed in more detail below, during the period of time that the outbound SA data structure is read into the buffer and is subsequently updated and written back to the SAD, a semaphore (or "lock") is placed on that particular SAD entry. This ensures that the SAD entry is not read and updated simultaneously, or substantially simultaneously, by another channel.

The IPSec hardware component in the first gateway computer 110 then forms a new IPSec datagram 300, 400 by encrypting and/or authenticating the IP datagram 200 by implementing the IPSec SA. The first gateway computer 110 then transmits the new IPSec datagram 300, 400 to the second gateway computer 114.

When the second gateway computer 114 receives the IPSec datagram 300, 400, it determines the appropriate IPSec SA in its inbound SAD 118 by parsing information from the IPSec header 404. Its IPSec hardware component then selects one of the plurality of independent channels to process the received datagram. Based on the information parsed from the IPSec header 404, an inbound SA data structure 600 is retrieved into a buffer from an appropriate entry in the SAD 118. Thereafter, the inbound SA data structure 600 is updated and written back to the same SAD entry. The IPSec hardware component in the second gateway computer 114 then properly processes the IPSec datagram 300, 400, and forwards it to the second individual computer workstation 112-1. Similar to the above-described processing of an outbound IP datagram, during the period of time that the inbound SA data structure 600 is read into the buffer and is subsequently updated and written back to the SAD 118, a semaphore is placed on that particular SAD entry, to prevent the simultaneous reading and updating of the entry by another channel.

Having generally described an IPSec datagram 300, 400, an outbound and an inbound SA data structure 500, 600, how an IPSec SA is established and, once established, utilized to process outbound and inbound IPSec datagrams, a more detailed description of the present invention will now be provided. In doing so, reference should first be made to FIG. 7, which depicts a block diagram of a portion of the internal IPSec processing hardware utilized in a computer system having multiple security channels. The computer system 700 may be a gateway or router, such as the first 110 or second 114 gateway computers, or a stand-alone computer, such as the individual computer workstations 108-1, 108-2, 108-3, . . . 108-N, 112-1, 112-2, 112-3, . . . 112-N. In any case, the computer system 700 includes a multi-channel IPSec hardware component 702, which is used to receive IP datagrams and transform them into IPSec datagrams 300, 400, and to receive IPSec datagrams 300, 400 and appropriately process them into IP datagrams. As indicated, the IPSec hardware component 702 may be designed to include various numbers of channels, e.g., up to N-channels. In a preferred embodiment, however, the number of channels is eight. Moreover, the IPSec hardware component 702 may be a general purpose microprocessor device or, in a preferred embodiment, an application specific hardware device (e.g., ASIC) that is designed specifically for IPSec implementation.

Figure 7:
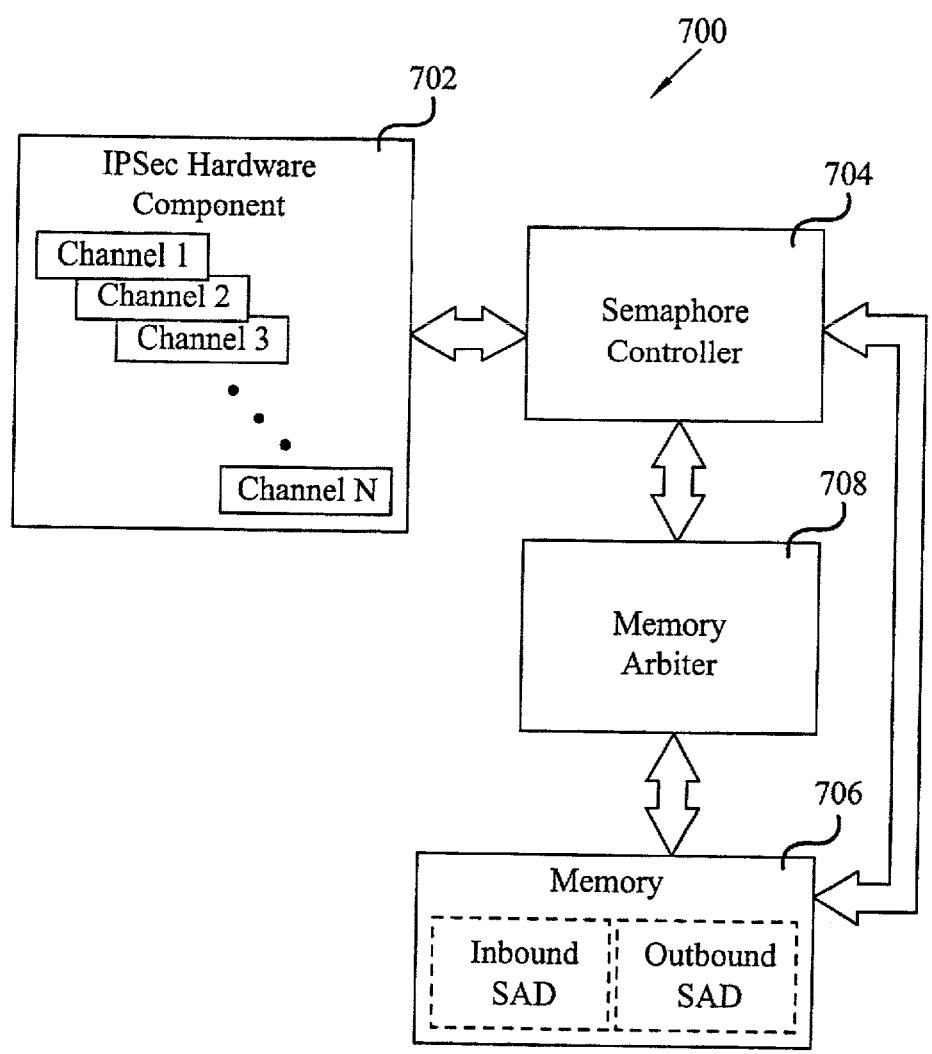
FIG. 7 depicts a block diagram of a portion of the internal IPSec processing hardware utilized in a computer system having multiple security channels according to an embodiment of the present invention.

A controller circuit 704, referred to herein as a semaphore controller because of the function it performs, is in communication with each of the N channels of the IPSec hardware component 702. A memory storage device 706, which includes a plurality of memory regions (or "entries") that comprise the computer's SADs, is coupled to both the semaphore controller 704 and a memory arbiter 708. Although FIG. 7 depicts a single memory storage device 706 that includes both an inbound and an outbound SAD, it will be appreciated that this is only exemplary of one embodiment, and that the SADs could be arranged as part of physically separate memory storage devices.

The memory arbiter 708 is provided since the computer system 700, of which FIG. 6 depicts only a small portion, includes numerous other devices that may need access to the memory storage device 706. The memory storage device 706 is similar to, and its function is the same as, the SADs 116, 118 described above with reference to FIG. 1. Hence, although FIG. 7 depicts the memory storage device 706 as being physically included as a part of the computer 700, this is only exemplary of a preferred embodiment. It is to be appreciated that the memory storage device 706 may be physically separate from the computer 700.

Figure 8:
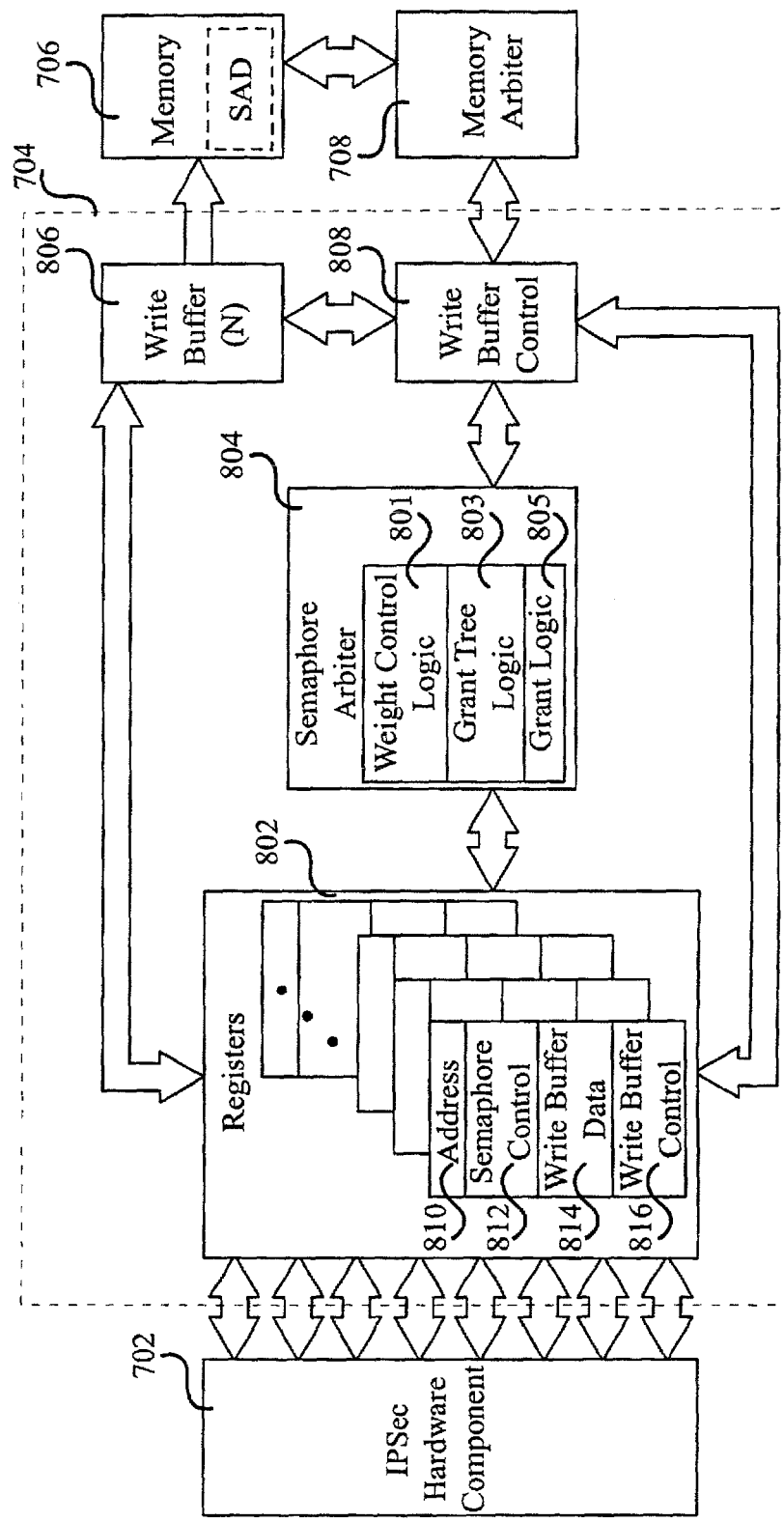
FIG. 8 is a functional block diagram of a semaphore controller according to an embodiment of the present invention.

Turning now to FIG. 8, a more detailed description of the functional blocks that comprise the semaphore controller 704 will be provided. As FIG. 8 illustrates, the semaphore controller 704 includes a register block 802, a semaphore arbiter 804, a write buffer 806, and a write buffer control block 808. The register block 802 includes N channels, each of which interfaces to one of the N channels in the IPSec hardware component 702. Each of the N channels in the register block 802 includes a plurality of individual registers. The individual registers within each register block channel include a semaphore address register 810, a semaphore control register 812, a write buffer control register 814, and a write buffer data register 816. It is to be appreciated that each register block channel may include additional registers beyond the four just mentioned. These additional registers would be used for functions not needed to understand the present invention, and are therefore not discussed further. The purpose of each of the mentioned registers in each register block channel will become apparent when the process carried out by the semaphore controller 704 to update SAD entries is described.

The semaphore arbiter 804 is the portion of the semaphore controller 704 that ensures only one of the N security channels at a time has access to a particular SAD entry. It thus prevents multiple channels from simultaneously (or substantially simultaneously) updating the same SAD entry. The semaphore arbiter 804 provides each channel access to an SAD entry on a first-come, first-serve basis. To accomplish this, the semaphore arbiter 804, in a preferred embodiment, utilizes three logic blocks—a weight control logic block 801, a semaphore grant tree logic block 803, and a grant logic block 805, each of which will now be discussed.

The weight control logic block 801 assigns a weight value to each of the N channels. In a preferred embodiment, the weight value assigned to each channel is a $(\log_2(N)+1)$-bit weight value. For example, in a preferred embodiment in which there are eight channels, each channel would have a 4-bit weight value (e.g., $\log_2(8)+1=3+1=4$). Specifically, the weight value associated with each channel is a $\log_2(N)$-bit (e.g., 3-bit in a preferred embodiment) weight value that is concatenated with a request bit in the channel's semaphore control register 712. In particular, the request bit, when set, is concatenated as the most significant bit of the weight value. The weight value associated with each channel is initialized to zero on power up. Thereafter, when a channel requests a semaphore for a particular SAD entry, as indicated by its request bit being set, and, before the request is granted, another channel asserts a request for the same entry, the channel's weight is incremented by one. In addition, the weight of all other channels that have a semaphore request to the same particular SAD entry that has not yet been granted will be incremented by one. It is to be appreciated that this implementation of the weight control logic block 801 is only exemplary of a preferred embodiment, and that other implementations could be utilized. Indeed, in a particular alternative arrangement, the $\log_2(N)$-bit weight value associchannel's request hit. The remaining operation of the weight control logic block 801 would be essentially identical.

The grant tree logic block 803 is coupled to the weight control logic block 801 and determines which of the N channels has the highest weight value for a particular SAD entry semaphore request, and issues a grant signal for the channel with the highest weight value. In the remote event that there are multiple requests for a particular SAD entry semaphore that have the same weight value, the grant tree logic block 803 implements a priority scheme to determine which channel receives the grant signal. In a preferred embodiment this priority scheme awards the lowest priority to the lowest channel and the highest priority to the Nth channel. The skilled artisan will appreciate that other priority schemes could be implemented.

The grant logic block 805 communicates with the grant tree logic block 803. In particular, based on the grant signal issued by the grant tree logic block 803, the grant logic block 805 sets a grant bit in the semaphore control register 812 of the appropriate channel (discussed further below), provided that an outstanding SAD entry semaphore request is pending for that channel. Once the grant bit is set in requesting channel's semaphore control register 812, the grant logic block 805 then resets the channel's weight value to zero.

The write buffer 806, when commanded by the write buffer control block 808, writes the updated SAs to the appropriate SAD entries. The write buffer 808 comprises N, 64-bit write buffer registers. In a preferred embodiment, in which there are 8 channels, the write buffer comprises a sixteen entry, 32-bit wide FIFO (first-in-first-out) register. As will be discussed in more detail below, the updated SA data structures are first written to the appropriate channel's FIFO in the write buffer 806. Then, when the channel's SAD entry semaphore request is released, the contents of the channel's write buffer FIFO are written to the appropriate SAD entry.

Operation of the write buffer 806, as was just noted, is controlled by the write buffer control block 808. In addition, the write buffer control block 808 interfaces with the memory arbiter 608 when requesting access to the memory storage device 606, which includes, among other things, the inbound and outbound SAD entries. In a preferred embodiment, the write buffer control block 808 comprises a finite state machine (FSM) that is controlled by firmware. An understanding of the write buffer control block 808 operation will become apparent from the ensuing discussion, which describes the process carried out by the semaphore controller 604 to update the inbound and outbound SAD entries.

Figure 9:
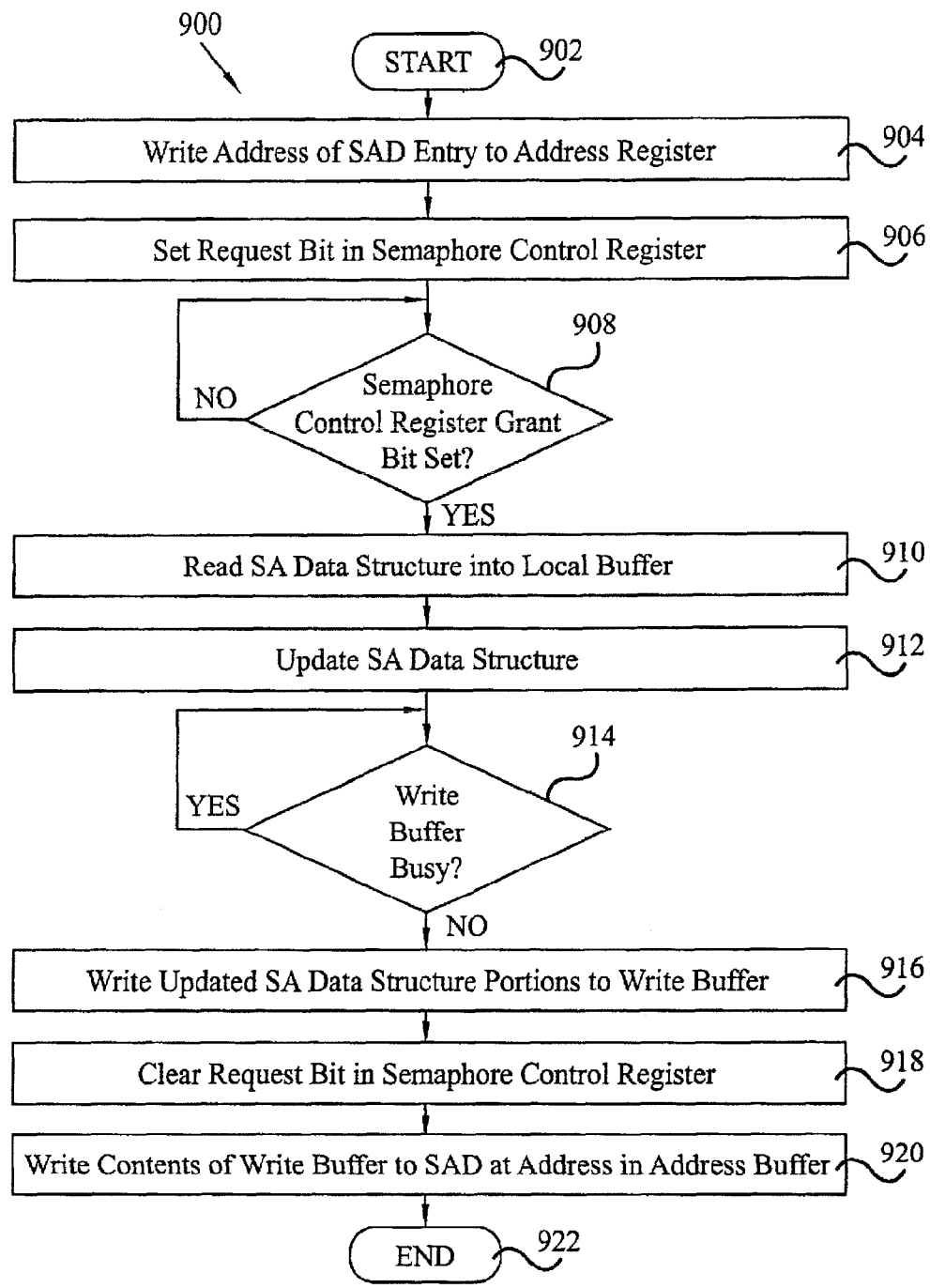
FIG. 9 is a flowchart depicting a process for updating SAD entries in a system having multiple security channels.

Referring now to FIG. 9 in combination with FIG. 8, the process 900 of updating SAD entries, as carried out by the semaphore controller 704, will be provided. In this regard, the parenthetical references to "BLOCKs" correspond to the particular reference numerals of the process flowchart depicted in FIG. 9. It is to be appreciated that the semaphore controller 704 is, in a preferred embodiment, controlled by firmware to carry out this process; however, the present invention also encompasses an embodiment in which the semaphore controller is controlled by software. In addition, the process discussed in detail below is for one of the N security channels. It is to be understood that this process may be carried out substantially simultaneously by each of the other N security channels comprising the system.

Nonetheless, the process 900 begins when a channel in the IPSec hardware component 702 needs to write an updated SA data structure to an SAD entry (BLOCK 902). When this occurs, the address of the SAD entry that needs to be updated is written to the address register 810 (BLOCK 904), and a request bit is set in the semaphore control register 812 (BLOCK 906). When the semaphore arbiter 804 determines that the channel should be granted the semaphore, a grant bit in the semaphore control register 812 is set (BLOCK 908). In response to the semaphore being granted, the SA data structures located in the SAD entry having the address in the address register 810 is then retrieved into the previously noted local buffer in each channel (BLOCK 910). Those portions of the retrieved SA data structure that need updated are then modified locally (BLOCK 912).

Thereafter, a "busy bit" in the write buffer control register 814 is checked to determine whether the write buffer 806 is busy (BLOCK 914), Once the write buffer busy bit is reset, indicating that the write buffer is available to be written to, the updated SA data structure portions are written to the write buffer 806, the request bit in the semaphore control register 812 is reset under the control of firmware (BLOCK 916), and the write buffer busy bit is once again set (BLOCK 918). The write buffer control block 808 monitors, among other things, the request bit in the semaphore control register 812. When the request bit is reset, and when the memory arbiter 708 grants access to the SAD, the write buffer control block 808 causes the write buffer 806 to write its contents to the SAD entry having the address in the address register 810 (BLOCK 920). The semaphore arbiter 804 then grants the semaphore to the next channel, if any, requesting access to the SAD entry (BLOCK 922).

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. In a system having multiple security channels, a method of modifying an entry in a security association database, the method associated with each channel comprising: determining whether another of the multiple security channels has a higher priority to access a security association database structure located at a predetermined address location in the security association database; retrieving the security association data structure from the predetermined address location when no other security channel has a higher priority to do so; modifying the retrieved security association data structure; and writing the modified security association data structure to the predetermined address location in the security association database.

2. The method of claim 1, wherein the step of determining whether another of the multiple security channels has a higher priority to retrieve the security association data structure comprises: requesting access to the predetermined address location; assigning a weight value to the request based on a sequential order of the request relative to access requests made by other of the security channels; and granting the access request to the security channel with the highest assigned weight value.

3. The method of claim 2, wherein the step of requesting access comprises setting a request bit in a control register.

4. The method of claim 3, wherein the step of granting the access request comprises setting a grant bit in the control register.

5. The method of claim 1, wherein the step of writing the modified security association data structure to the predetermined address location comprises: writing the modified security association data structure to a write buffer prior to writing it to the predetermined address location; and writing the modified security association data structure to the predetermined address location from the write the buffer.

6. The method of claim 5, wherein the step of requesting access comprises setting a request bit in a control register, and wherein the method further comprises: resetting the request bit prior to writing the modified security association data structure to the predetermined address location from the write buffer.

7. The method of claim 5, further comprising: determining whether the write buffer is busy prior to writing the modified security association data structure thereto.

8. The method of claim 1, further comprising: storing the retrieved security association data structure in a local memory; and modifying the retrieved security association data structure in the local memory.

9. The method of claim 1, further comprising: storing the predetermined address location of the retrieved security association data structure in a register.

10. In a system having multiple security channels, a method of modifying an entry in a security association database, the method associated with each channel comprising: requesting access to a predetermined address location in the security association database; assigning a weight value to the request based on a sequential order of the request relative to access requests to the predetermined address location made by other of the security channels; retrieving the security association data structure from the predetermined address location when the channel has a higher priority request relative to the other security channel requests; modifying the retrieved security association data structure; and writing the modified security association data structure to the predetermined address location in the security association database.

11. The method of claim 10, wherein the step of requesting access comprises setting a request bit in a control register.

12. The method of claim 10, wherein the security association data structure is retrieved in response to setting a grant bit in the control register.

13. The method of claim 10, wherein the step of writing the modified security association data structure to the predetermined address location comprises: writing the modified security association data structure of to a write buffer prior to writing it to the predetermined address location; and writing the modified security association data structure to the predetermined address from the write the buffer.

14. The method of claim 13, wherein the step of requesting access comprises setting a request bit in a control register, and wherein the method further comprises: resetting the request bit prior to writing the modified security association data structure to the predetermined address location from the write buffer.

15. The method of claim 13, further comprising: determining whether the write buffer is busy prior to writing the modified security association data structure thereto.

16. The method of claim 10, further comprising: storing the retrieved security association data structure in a local memory; and modifying the retrieved security association data structure.

17. The method of claim 10, further comprising: storing the predetermined address location of the retrieved security association data structure in a register.

18. In a system having multiple security channels, a method of modifying an entry in a security association database, the method associated with each channel comprising: requesting access to a predetermined address location in the security association database; assigning a weight value to the request based on a sequential order of the request relative to access requests to the predetermined address location made by other of the security channels; retrieving the security association data structure from the predetermined address location when the channel has a higher priority request relative to the other security channel requests; modifying the retrieved security association data structure; determining whether a write buffer is busy; writing the modified security association data structure to the write buffer when it is not busy; and writing the modified security association data structure to the predetermined address location in the security association database from the write buffer.

19. A computer-readable medium containing computer executable code for instructing one or more security channels in a computer system having multiple security channels to modify an entry in a security association database, the instructions comprising: determining whether another of the multiple security channels has a higher priority to access a security association database structure located at a predetermined address location in the security association database; retrieving the security association data structure from the predetermined address location when no other security channel has a higher priority to do so; modifying the retrieved security association data structure; and writing the modified security association data structure to the predetermined address location in the security association database.

* * * * *